(12) United States Patent
Saito

(10) Patent No.: US 11,453,307 B2
(45) Date of Patent: Sep. 27, 2022

(54) CONTROL METHOD FOR VEHICLE, INFORMATION PROCESSING DEVICE, AND VEHICLE CONTROL SYSTEM

(71) Applicant: TOYOTA JIDOSHA KABUSHIKI KAISHA, Toyota (JP)

(72) Inventor: Kan Saito, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 374 days.

(21) Appl. No.: 15/994,567

(22) Filed: May 31, 2018

(65) Prior Publication Data
US 2018/0345951 A1   Dec. 6, 2018

(30) Foreign Application Priority Data

Jun. 2, 2017   (JP) .............................. JP2017-109945

(51) Int. Cl.
  *B60L 58/12*     (2019.01)
  *B60W 20/12*    (2016.01)
  (Continued)

(52) U.S. Cl.
  CPC ........... *B60L 58/12* (2019.02); *B60L 15/2045* (2013.01); *B60W 20/12* (2016.01);
  (Continued)

(58) Field of Classification Search
  CPC ............. B60W 20/12; B60W 2556/55; B60W 2530/00; B60W 2556/50;
  (Continued)

(56) References Cited

U.S. PATENT DOCUMENTS

2008/0270015 A1   10/2008   Ishikawa et al.
2008/0287141 A1*  11/2008   Vogel ..................... G01C 21/28
                                                              455/456.3
(Continued)

FOREIGN PATENT DOCUMENTS

CN       104408915 A     3/2015
EP         2416119 A2    2/2012
(Continued)

OTHER PUBLICATIONS

Extended European Search Report issued to EP Application No. 18175185.0 dated Nov. 8, 2018 (11 pages).

*Primary Examiner* — Jeffrey C Boomer
*Assistant Examiner* — Annmarie Dressler
(74) *Attorney, Agent, or Firm* — Hunton Andrews Kurth LLP

(57) ABSTRACT

A control method for a vehicle which is executable by at least one information processing device including a communication unit, includes: collecting vehicle information from the vehicle in a range of a communication data amount or a communication frequency that is allowed in communication with the vehicle, based on information about the communication data amount or the communication frequency; and calculating an accuracy of control of the vehicle based on an information amount of the collected vehicle information; and producing a control command based on the calculated accuracy.

8 Claims, 3 Drawing Sheets

(51) Int. Cl.
*B60L 15/20* (2006.01)
*B60W 20/10* (2016.01)

(52) U.S. Cl.
CPC .. *B60L 2260/54* (2013.01); *B60W 2510/0657* (2013.01); *B60W 2510/083* (2013.01); *B60W 2520/10* (2013.01); *B60W 2530/00* (2013.01); *B60W 2556/45* (2020.02); *B60W 2556/55* (2020.02); *Y02T 10/64* (2013.01); *Y02T 10/70* (2013.01); *Y02T 10/72* (2013.01); *Y02T 90/16* (2013.01); *Y10S 903/93* (2013.01)

(58) Field of Classification Search
CPC ... B60W 2510/0657; B60W 2510/083; B60W 2520/10; B60W 50/0097; B60W 20/10; B60W 50/00; B60W 2530/13; B60W 2556/45; B60L 58/12; B60L 15/2045; B60L 3/00; B60L 2260/54; G01C 21/3469; Y10S 903/93; G08G 1/00; B60R 16/02; B60R 16/023; Y02T 10/64; Y02T 10/70; Y02T 10/72; Y02T 90/16
See application file for complete search history.

(56) References Cited

U.S. PATENT DOCUMENTS

| | | | | |
|---|---|---|---|---|
| 2012/0022781 | A1* | 1/2012 | Wilson | G01C 21/3415 |
| | | | | 701/410 |
| 2012/0041671 | A1* | 2/2012 | Miura et al. | |
| 2014/0257608 | A1* | 9/2014 | Dufford | B60W 20/40 |
| | | | | 701/22 |
| 2014/0297108 | A1 | 10/2014 | Koyama et al. | |
| 2016/0052512 | A1* | 2/2016 | Buford | G01C 21/3469 |
| | | | | 701/22 |
| 2017/0153643 | A1 | 6/2017 | Torii | |

FOREIGN PATENT DOCUMENTS

| | | | |
|---|---|---|---|
| JP | 2005032010 | A | 2/2005 |
| JP | 2005091112 | * | 9/2005 |
| JP | 2008028510 | A | 2/2008 |
| JP | 4360419 | B2 | 11/2009 |
| JP | 2014064461 | A | 4/2014 |
| JP | 2014198517 | A | 10/2014 |
| WO | 2014/080803 | A1 | 5/2014 |
| WO | 2015/115538 | A1 | 8/2015 |

* cited by examiner

CONTROL METHOD FOR VEHICLE, INFORMATION PROCESSING DEVICE, AND VEHICLE CONTROL SYSTEM

INCORPORATION BY REFERENCE

The disclosure of Japanese Patent Application No. 2017-109945 filed on Jun. 2, 2017 including the specification, drawings and abstract is incorporated herein by reference in its entirety.

BACKGROUND

1. Technical Field

The disclosure relates to a control method for a vehicle, an information processing device, and a vehicle control system.

2. Description of Related Art

Conventionally, there is a vehicle information providing device that can upload a necessary amount of vehicle information including the state of a storage battery, to a center at a necessary timing (for example, see Japanese Patent Application Publication No. 2014-064461).

SUMMARY

Incidentally, it is desired that the data amount of the vehicle information to be uploaded to the center be sufficiently large. However, a data amount (communication data amount) that is allowed in communication and a communication fee differ depending on a region where a vehicle travels, a common carrier, the content of a contract with the common carrier, and the like. Therefore, there is a concern that it is not possible to secure the communication data amount sufficient to analyze the data in the center.

In the case of controlling the vehicle by sending, to the vehicle, a control command for controlling the vehicle based on the data analyzed in the center, there is a trade-off relation between the data amount of the vehicle information to be uploaded to the center and the accuracy of vehicle control. Therefore, it is preferable to consider the balance between the communication data amount and the accuracy of the vehicle control.

The disclosure provides a vehicle control method, an information processing device and a vehicle control system in which the balance between the communication data amount and the accuracy of the vehicle control is considered.

A first aspect of the disclosure provides vehicle control method which is executable by at least one information processing device that includes a communication unit. The control method according to the first aspect includes: collecting vehicle information from the vehicle in a range of a communication data amount or a communication frequency that is allowed in communication with the vehicle, based on information about the communication data amount or the communication frequency; and calculating an accuracy of control of the vehicle based on an information amount of the collected vehicle information; and producing a control command based on the calculated accuracy.

The control method for the vehicle according to the first aspect may include acquiring the information about the communication data amount or the communication frequency, through the communication unit.

According to the first aspect, it is possible to calculate the accuracy depending on the communication data amount.

Accordingly, it is possible to provide a vehicle control method in which the balance between the communication data amount and the accuracy of the vehicle control is considered.

The control method for the vehicle according to the first aspect may include: deriving a traveling load for a route, based on a traveling state of other vehicles on the route, the route being a route where the vehicle plans to travel; generating a fuel reduction command based on the derived traveling load, the fuel reduction command being a command to reduce fuel consumption of the vehicle on the route; sending the fuel reduction command to the vehicle through the communication unit; and regulating a fuel reduction amount in accordance with the fuel reduction command, depending on the calculated accuracy.

According to the above configuration, based on the accuracy depending on the communication data amount, it is possible to regulate a fuel reduction command to be generated based on a traveling load.

Accordingly, it is possible to provide a vehicle control method in which the balance between the communication data amount and the accuracy of the vehicle control is considered, by reducing fuel, using the fuel reduction command regulated based on the accuracy depending on the communication data amount.

In the first aspect, the regulating the fuel reduction amount may include decreasing the fuel reduction amount in accordance with the fuel reduction command, in response to a decrease in the calculated accuracy.

According to the above configuration, it is possible to decrease a fuel reduction amount in accordance with the fuel reduction command to be generated based on the traveling load, in response to the decrease in the accuracy.

Accordingly, it is possible to provide a vehicle control method in which the balance between the communication data amount and the accuracy of the vehicle control is considered, by decreasing the fuel reduction amount in response to the decrease in the accuracy.

In the first aspect, in the regulating the fuel reduction amount, the fuel reduction amount in accordance with the fuel reduction command may be set to a constant value, when the calculated accuracy is higher than a first threshold.

According to the above configuration, when the calculated accuracy is higher than a first threshold, the control is performed without decreasing the fuel reduction amount.

Accordingly, when the calculated accuracy is high, the control for reducing the fuel is performed with no change, and it is possible to provide a vehicle control method in which the balance between the communication data amount and the accuracy of the vehicle control is considered.

In the first aspect, in the regulating the fuel reduction amount, the fuel reduction amount in accordance with the fuel reduction command may be decreased depending on the calculated accuracy, when the calculated accuracy is equal to or lower than a first threshold and is higher than a second threshold, the second threshold being lower than the first threshold.

According to the above configuration, when the calculated accuracy is equal to or lower than the first threshold and is higher than a second threshold, the control is performed with the fuel reduction amount decreased depending on the calculated accuracy.

Accordingly, when the calculated accuracy is equal to or lower than the first threshold and is higher than the second threshold, it is possible to provide a vehicle control method in which the balance between the communication data amount and the accuracy of the vehicle control is considered, by decreasing the fuel reduction amount depending on the calculated accuracy.

In the first aspect, in the regulating the fuel reduction amount, the fuel reduction amount in accordance with the fuel reduction command may be set to zero, when the calculated accuracy is equal to or lower than a second threshold.

According to the above configuration, when the calculated accuracy is equal to or lower than the second threshold, the control for the fuel reduction by the fuel reduction command is not performed.

Accordingly, when the calculated accuracy is equal to or lower than the second threshold, it is possible to provide a vehicle control method in which the balance between the communication data amount and the accuracy of the vehicle control is considered, by decreasing the fuel reduction amount depending on the calculated accuracy while setting the fuel reduction command to zero.

In the first aspect, a common carrier may be selected on a side of the vehicle, the common carrier providing a communication service for communication through the communication unit.

According to the above configuration, it is possible to perform the control of the vehicle, using a communication service of a common carrier that is selected on the side of the vehicle and that gives a low communication cost.

Accordingly, it is possible to provide a vehicle control method in which the balance between the communication data amount and the accuracy of the vehicle control is considered, using the communication service of the common carrier that gives a low communication cost.

The control method for the vehicle according to the first aspect may include: determining the communication data amount or the communication frequency such that a fuel consumption reduction effect with respect to a communication cost is large, the fuel consumption reduction effect being a fuel consumption reduction effect in the vehicle configured to receive, by the communication, the fuel reduction command to reduce the fuel consumption of the vehicle, the communication cost being a communication cost of the communication with the vehicle through the communication unit.

According to the above aspect, it is possible to maximize a fuel consumption reduction effect in a limited communication cost.

Accordingly, it is possible to provide a vehicle control method in which the balance between the communication data amount and the accuracy of the vehicle control is considered, by maximizing the fuel consumption reduction effect with respect to the communication cost.

A second aspect of the disclosure provides an information processing device that executes the control method for the vehicle according to the first aspect.

A third aspect of the disclosure provides An information processing device including: a communication unit; and circuitry configured to collect vehicle information from a vehicle in a range of a communication data amount or a communication frequency that is allowed in communication with the vehicle, based on information about the communication data amount or the communication frequency, the communication data amount or the communication frequency being acquired through the communication unit, calculate an accuracy of control of the vehicle, based on an information amount of the collected vehicle information, and produce a control command for the control of the vehicle, based on the calculated accuracy.

According to the third aspect, it is possible to calculate the accuracy depending on the communication data amount.

Accordingly, it is possible to provide an information processing device in which the balance between the communication data amount and the accuracy of the vehicle control is considered.

A fourth aspect of the disclosure provides a vehicle control system including: a vehicle; and an information processing device configured to communicate with the vehicle, the information processing device including a communication unit and circuitry. The circuitry is configured to collect vehicle information from the vehicle in a range of a communication data amount or a communication frequency that is allowed in communication with the vehicle, based on information about the communication data amount or the communication frequency, the communication data amount or the communication frequency being acquired through the communication unit, calculate an accuracy of control of the vehicle, based on an information amount of the collected vehicle information, and produce a control command for the control of the vehicle, based on the calculated accuracy.

According to the fourth aspect, it is possible to calculate the accuracy depending on the communication data amount.

Accordingly, it is possible to provide a vehicle control system in which the balance between the communication data amount and the accuracy of the vehicle control is considered.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment to which a vehicle control method, an information processing device and a vehicle control system in the disclosure are applied will be described.

EMBODIMENT

Figure 1:
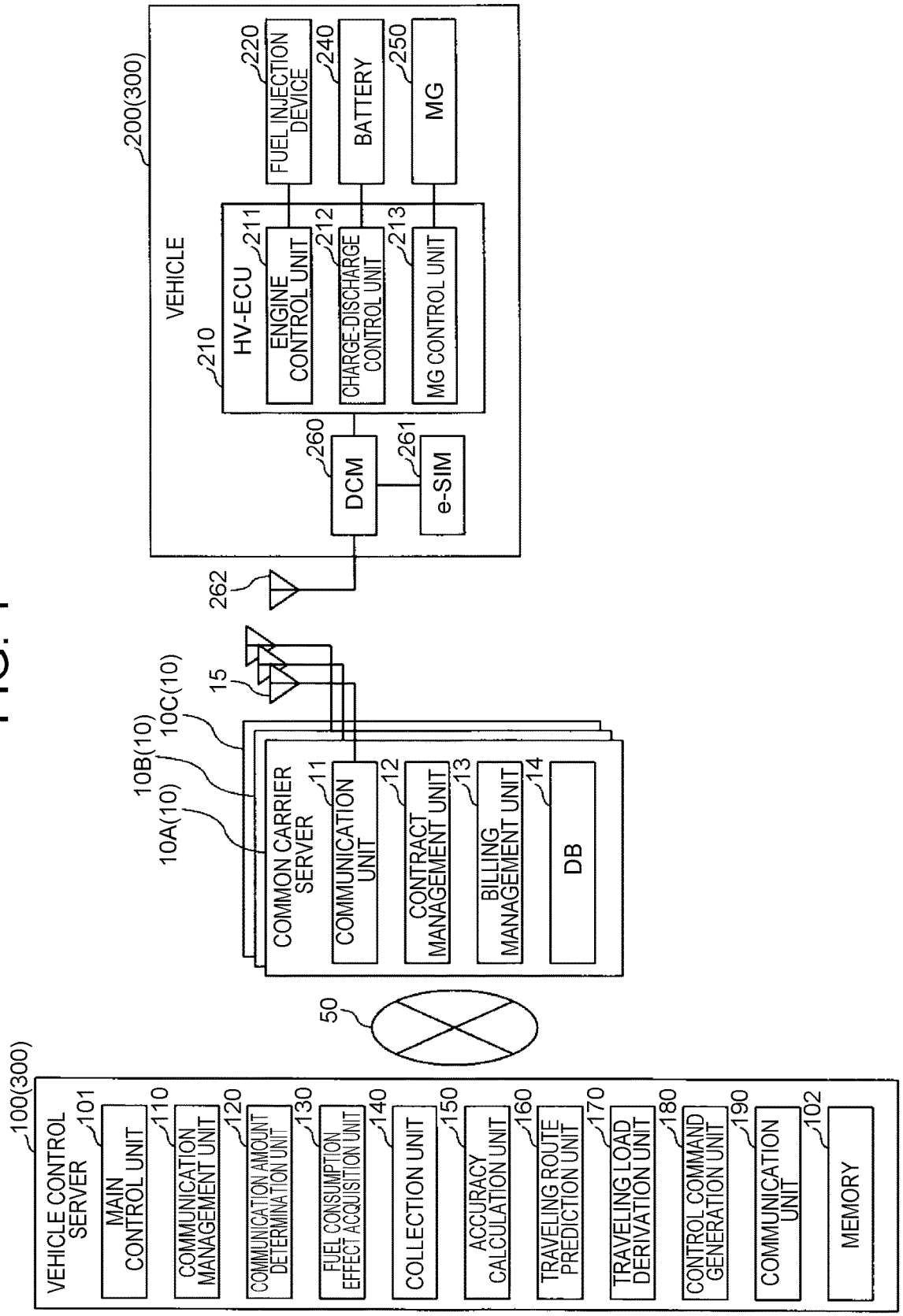
FIG. 1 is a diagram showing a relation of a vehicle control system 300 in an embodiment and common carrier servers 10A, 10B, 10C.

FIG. 1 is a diagram showing a relation of a vehicle control system 300 in the embodiment and common carrier servers 10A, 10B, 10C.

The vehicle control system 300 includes a vehicle control server 100 and a vehicle 200. The vehicle control server 100 can perform data communication with the common carrier servers 10A, 10B, 10C through an internet 50, and the vehicle 200 can perform data communication with any one of the common carrier servers 10A, 10B, 10C through a communication line.

Vehicle information such as a traveling history of the vehicle 200 is uploaded to the vehicle control server 100 through any one of the common carrier servers 10A, 10B, 10C. Further, a control command for the vehicle 200 that is generated by the vehicle control server 100 is sent to the vehicle 200 through any one of the common carrier servers 10A, 10B, 10C. The control command is a control command for changing the driving state of the vehicle 200 such that a fuel consumption amount (fuel consumption) decreases.

Hereinafter, the vehicle 200 is a user's own vehicle, and is a vehicle that allows the driving state to be remotely controlled (changed) by the control command. Further, a configuration in which the vehicle 200 is a hybrid vehicle (HV) will be described.

The common carrier servers 10A, 10B, 10C are servers of different common carriers from each other. The common carrier is a telecommunications operator (carrier) that provides a communication service using a public telecommunication network such as a telephone line, and in the embodiment, as an example, there are three common carriers.

A data communication module (DCM) 260 of the vehicle 200 includes an embedded subscriber identity module (e-SIM) 261, and therefore, can select and use one of the common carrier servers 10A, 10B, 10C. Further, the DCM 260 includes an antenna 262 that is used in the communication with the common carrier servers 10A, 10B, 10C.

The common carrier servers 10A, 10B, 10C have the same configuration as each other. Hereinafter, the common carrier servers 10A, 10B, 10C are referred to as merely a common carrier server 10, when being particularly not distinguished.

The common carrier server 10 includes a communication unit 11, a contract management unit 12, a billing management unit 13, a database (DB) 14, and an antenna 15.

The communication unit 11 has a function to perform wire or wireless data communication with the vehicle control server 100 through the internet 50, and a function to perform wireless data communication with the vehicle 200 through the communication line. To the communication unit 11, the antenna 15 is connected, and the antenna 15 is used for the data communication with the vehicle 200. The common carrier server 10 and the vehicle 200 perform wireless data communication through the antenna 15 and the antenna 262.

The contract management unit 12 is a processing unit that manages contract contents for customers to use the communication service of the common carrier. Data indicating the contract content for each customer is stored in the DB 14. The contract content includes communication rate, communication unit price, maximal communication amount, communication fee, and the like.

The billing management unit 13 is a processing unit that calculates and manages a usage fee for each customer. The billing management unit 13 reads the data that indicates the contract content and that is stored in the DB 14 by the contract management unit 12, and calculates the usage fee depending on an usage amount (communication data amount) of the communication service of each customer to store the usage fee in the DB 14. For example, every month, the usage fee is calculated and a charge is made for the customer.

The DB 14 is a memory such as a hard disk drive (HDD), and stores data indicating the contract content and the usage fee.

The vehicle control server 100 is a computer including a central processing unit (CPU), a random access memory (RAM), a read only memory (ROM), a hard disk drive (HDD), and the like.

The vehicle control server 100 includes a main control unit 101, a communication management unit 110, a communication amount determination unit 120, a fuel consumption effect acquisition unit 130, a collection unit 140, an accuracy calculation unit 150, a traveling route prediction unit 160, a traveling load derivation unit 170, a control command generation unit 180, a communication unit 190, and a memory 102. Among them, for the main control unit 101 to the communication unit 190, functions of programs that are executed by the vehicle control server 100 are shown as functional blocks. For the memory 102, data storage parts such as the RAM, ROM and HDD included in the vehicle control server 100 are functionally shown.

The main control unit 101 is a processing unit that integrally controls the vehicle control server 100, and executes processes other than processes that are performed by the communication management unit 110 to the communication unit 190.

The communication management unit 110 acquires the data indicating the communication rate, the communication unit price, the maximal communication amount and the communication fee of the contract content, from the common carrier server 10, and stores the data in the memory 102. The communication management unit 110 accesses the common carrier servers 10A, 10B, 10C, acquires the data indicating the communication rate, the communication unit price, the maximal communication amount and the communication fee, from the three carriers, and stores the data in the memory 102. The communication management unit 110 compares the communication rate, the communication unit price, the maximal communication amount and the communication fee among the three carriers, and selects a common carrier that gives the lowest cost.

The communication amount determination unit 120 determines a communication data amount and a communication frequency that are allowed in communication with the DCM 260 of the vehicle 200 by the communication unit 190, before the collection unit 140 collects traveling histories. The communication amount determination unit 120 is an exemplary acquisition unit. There is a trade-off relation between the data amount of the vehicle information to be uploaded from the vehicle 200 to the vehicle control server 100 and the accuracy of the vehicle control to be realized by the control command that is generated by the vehicle control server 100.

Therefore, the communication amount determination unit 120 determines the communication data amount and the communication frequency such that the accuracy of the vehicle control is maximized with respect to a certain communication fee. In other words, the communication amount determination unit 120 determines the communication data amount and the communication frequency such that the reduction effect of fuel consumption is maximized with respect to a certain communication fee.

The communication fee is determined by the contract content. Therefore, for example, the communication data amount and the communication frequency may be determined depending on the kind of the vehicle information to be uploaded from the vehicle 200. The data amount, update frequency, important degree and others of the vehicle information differ depending on the kind of the vehicle information, and the communication amount determination unit 120 may determine the communication data amount and the communication frequency, for example, such that the communication frequency is increased when the data amount is small and the communication frequency is decreased when the data amount is large.

The fuel consumption effect acquisition unit 130 acquires (reads) data indicating a fuel consumption effect from the memory 102. The fuel consumption means a fuel consumption amount. The fuel consumption effect is a characteristic indicating a relation of a fuel cost reduction amount to the communication data amount, and means the effect of the increase in the communication data amount on the reduction in the fuel cost. The fuel cost is the price of the fuel, and the fuel cost reduction amount means a fuel cost (difference) that is reduced when a reduction control for the fuel consumption with the control command to be generated by the vehicle control server 100 is performed, compared to when the reduction control for the fuel consumption is not performed.

Figure 2:
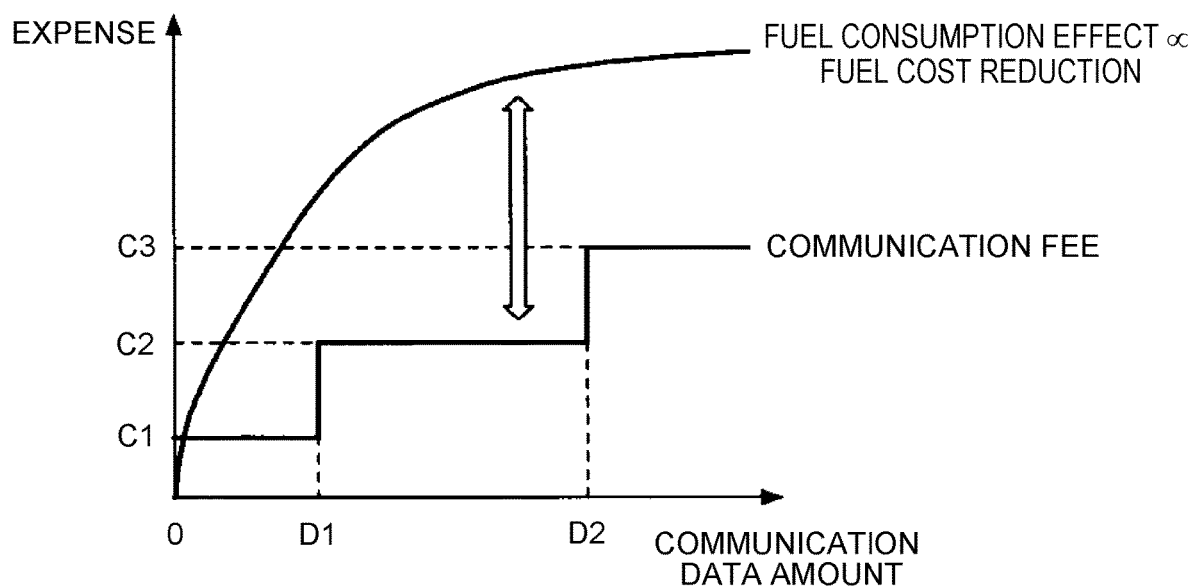
FIG. 2 is a characteristic diagram showing a relation of a fuel consumption effect and a communication fee.

Here, FIG. 2 is described. FIG. 2 is a characteristic diagram showing a relation of the fuel consumption effect and a communication fee. In FIG. 2, the abscissa axis indicates the communication data amount, and the ordinate axis indicates an expense (the fuel cost and the communication fee). As shown in FIG. 2, as an example, a stepwise constant-rate system is adopted, and when the communication data amount increases, the communication fee increases in a stepwise (stair-like) manner. When the communication data amount is zero to D1, the communication fee is constant at an expense C1. When the communication data amount is D1 to D2, the communication fee is constant at an expense C2. When the communication data amount is D2 or more, the communication fee is constant at an expense C3.

As a characteristic, the fuel consumption effect rapidly increases at an initial step when the communication data amount starts to increase from zero, and the fuel consumption effect is saturated when the communication data amount increases to a certain degree. This shows that the effect increases when the fuel consumption reduction control with the control command is performed compared to when the fuel consumption reduction control with the control command is not performed (when the communication data amount is zero), and the reduction effect is saturated when the fuel consumption reduction control with the control command is performed to a certain degree.

The data about the communication fee shown in FIG. 2 is determined by the communication rate, the communication unit price, the maximal communication amount and the communication fee that are acquired by the communication management unit 110.

The characteristic indicating the fuel consumption effect is acquired from the DB 102 by the fuel consumption effect acquisition unit 130. The characteristic indicating the fuel consumption effect may be acquired at the time of an experiment or development for the vehicle 200, and the data acquired in this way may be stored in the DB 102. Further, for example, the characteristic indicating the fuel consumption effect may be acquired by analyzing big data that is constructed by traveling data to be uploaded from many vehicles (the vehicle 200 and a plurality of vehicles) to the vehicle control server 100, and the acquired data may be stored in the DB 102.

The collection unit 140 collects the vehicle information of the vehicle 200 in a range of the communication data amount and the communication frequency. The vehicle information is information about the vehicle 200 that includes the traveling history of the vehicle 200. For example, the traveling history includes the position (latitude and longitude) of the vehicle 200, vehicle speed, traveling load and the like. In the case of a hybrid vehicle (HV), in addition to the above traveling history, the vehicle information includes traveling drive power, motor generator (MG) torque, charge-discharge electric power of a battery, the driving state (output torque, engine speed, fuel injection amount and others) of an engine, and the like. The collection unit 140 stores the vehicle information to be uploaded from the vehicle 200, in the memory 102.

The accuracy calculation unit 150 calculates a predicted value of the accuracy of the vehicle control, from the data amount of the traveling history of the vehicle 200. For example, the accuracy calculation unit 150 may calculate a first predicted value, when the data amount is a first predetermined value, and may calculate a second predicted value larger than the first predicted value, when the data amount is a second predetermined value larger than the first predetermined value.

The predicted value of the accuracy of the vehicle control only needs to increase with the increase in the data amount, and may have a proportional relation, or may have a characteristic in which the predicted value is saturated when the data amount increases to a certain degree similarly to the fuel consumption effect shown in FIG. 2. The relation of the data amount and the predicted value of the accuracy of the vehicle control may be previously determined by an experiment or the like. The data indicating the relation of the data amount and the predicted value of the accuracy of the vehicle control may be stored in the memory 102, and the predicted value of the accuracy of the vehicle control depending on the data amount may be read from the memory 102 by the accuracy calculation unit 150.

From the traveling history of the vehicle 200, the traveling route prediction unit 160 statistically predicts a destination, and predicts a subsequent traveling route. The data to be used for the statistics is a database that stores past traveling histories about the vehicle 200 and other vehicles. The database may be stored in the memory 102. Alternatively, the database may be stored in a memory of a separate server from the vehicle control server 100, and the vehicle control server 100 may access the separate server to read the database. The destination is not limited to a final destination of the vehicle 200 during traveling, and may be a stop place on the way to the final destination.

The traveling load derivation unit 170 derives a future traveling load on the vehicle 200, based on a vehicle speed distribution and a traveling load distribution that are aggregated from other vehicles on a route where the vehicle 200 travels. The traveling load derivation unit 170 is an exemplary load derivation unit. The route is a road shown as a link on an electronic map. The traveling load is a load value during the traveling of the vehicle 200, as exemplified by fuel consumption. In the embodiment, the fuel consumption is used as the traveling load. In the case of knowing vehicle speeds and fuel consumptions of other vehicles for each route, it is possible to predict the future traveling load on the vehicle 200 for the movement on the route.

The control command generation unit 180 generates a control command to be sent to the vehicle 200, based on the future traveling load on the vehicle 200 that is predicted by the traveling load derivation unit 170. The control command generation unit 180 is an exemplary command generation unit. The control command generation unit 180 generates the control command such that the fuel consumption of the vehicle 200 is reduced as the predicted traveling load is larger.

The control command generation unit 180 regulates the control command, depending on the predicted value of the accuracy of the vehicle control that is calculated by the accuracy calculation unit 150. More specifically, the control command generation unit 180 regulates the control command such that the reduction amount of the fuel consumption in accordance with the control command decreases as the predicted value of the accuracy of the vehicle control that is calculated by the accuracy calculation unit 150 is lower. This will be described with use of FIG. 3.

Figure 3:
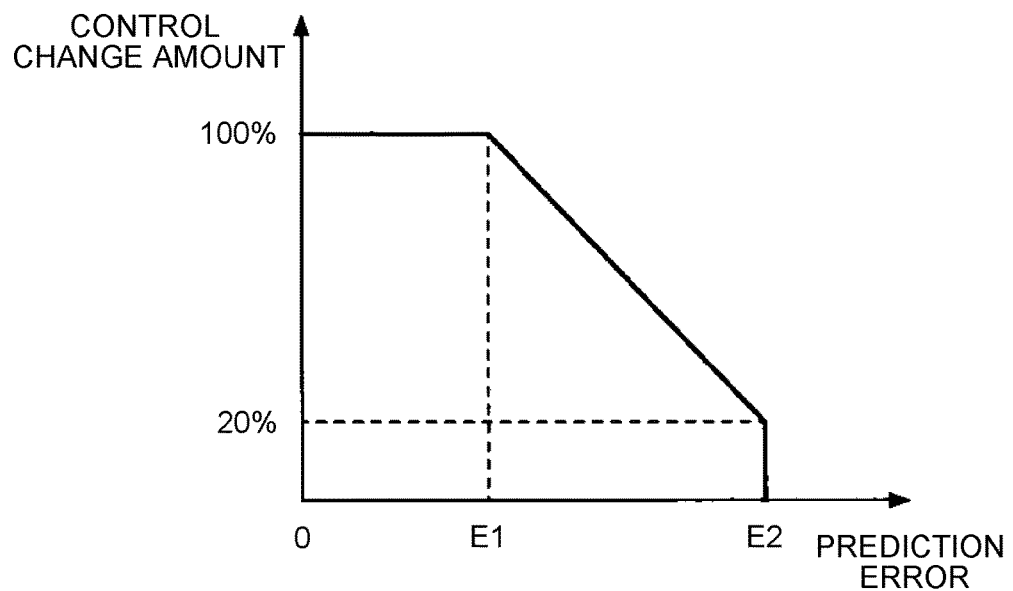
FIG. 3 is a diagram showing a relation of an error of a predicted value of the accuracy of vehicle control and a control change amount.

FIG. 3 is a diagram showing a relation of an error (prediction error) of the predicted value of the accuracy of the vehicle control and a control change amount. The prediction error is an error that increases as the predicted value of the accuracy of the vehicle control is lower, and for example, is the reciprocal of the predicted value of the accuracy of the vehicle control.

The control change amount means an amount by which the control is changed for reducing the fuel consumption in accordance with the control command. For example, when the HV is accelerated, the control amount of a motor generator 250 (MG 250) is changed such that the ratio of the output of the MG 250 is increased compared to before the control change, for reducing the fuel consumption. The control change amount is an exemplary fuel reduction command that is used in performing the control for reducing the fuel consumption.

In FIG. 3, when the prediction error on the abscissa axis is small, the control change amount may be set to 100%. For example, when the prediction error on the abscissa axis is equal to or more than zero and is less than E1, the control change amount may be set to 100%. When the control change amount is 100%, the control command generation unit 180 regulates the control command such that the control change amount indicated by the control command is 100%. That is, in this case, the control command to be generated by the control command generation unit 180 is not regulated by the predicted value of the accuracy of the vehicle control, and is output with no change (at 100%). When the prediction error is equal to or more than zero and is less than E1, the predicted value of the accuracy of the vehicle control is higher than a first threshold. The setting of the control change amount to 100% is the setting to a constant value indicated as the fuel reduction amount in accordance with the fuel reduction command without decreasing the fuel reduction amount.

When the prediction error on the abscissa axis is equal to or more than E1 and is less than E2, the control change amount may be linearly decreased from 100% to 20%. When the control change amount is 20%, the control command generation unit 180 regulates the control command such that the control change amount indicated by the control command is 20%. That is, in this case, the control command to be generated by the control command generation unit 180 is regulated to 20% by the predicted value of the accuracy of the vehicle control, and is output. When the prediction error is equal to or more than E1 and is less than E2, the predicted value of the accuracy of the vehicle control is equal to or lower than the first threshold, and is higher than a second threshold that is lower than the first threshold. The linear decrease in the control change amount from 100% to 20% is the decrease in the fuel reduction amount in accordance with the fuel reduction command depending on the calculated accuracy.

When the prediction error on the abscissa axis is equal to or more than E2, the control change amount may be set to 0%. When the control change amount is 0%, the control command generation unit 180 regulates the control command such that the control change amount indicated by the control command is 0%. That is, in this case, the change in the control by the control command generated by the control command generation unit 180 for reducing the fuel consumption of the vehicle 200 is not performed. When the prediction error is equal to or more than E2, the predicted value of the accuracy of the vehicle control is equal to or lower than the second threshold. The setting of the control change amount to 0% is the setting of the fuel reduction amount in accordance with the fuel reduction command to zero.

For example, the data indicating the relation of the predicted error and the control change amount shown in FIG. 3 may be stored in the memory 102, and the control command generation unit 180 may regulate the control command to be generated based on the future traveling load on the vehicle 200 that is predicted by the traveling load derivation unit 170, before the output.

The communication unit 190 is a communication processing unit that is connected with the common carrier servers 10A, 10B, 10C through the internet 50, and for example, is a modem. The communication unit 190 sends the control command to the vehicle 200.

The memory 102 is realized by the HDD of the vehicle control server 100, or the like, and is a storage unit in which a variety of data is stored.

The vehicle 200 includes an HV-ECU (Electric Control Unit) 210, a fuel injection device 220, a battery 240, the motor generator (MG) 250, and the DCM 260.

The HV-ECU 210 includes an engine control unit 211, a charge-discharge control unit 212 and an MG control unit 213. The engine control unit 211 performs a control of the engine of the vehicle 200 (an output control depending on a throttle opening degree and the like). Since the vehicle 200 is a hybrid vehicle (HV), the engine control unit 211 performs the control in cooperation with the charge-discharge control unit 212 and the MG control unit 213.

The charge-discharge control unit 212 controls the charge/discharge of the battery 240, depending on the traveling state of the vehicle 200. More specifically, the vehicle 200 includes a step-up and step-down converter that performs the charge and discharge of the battery 240, and therefore, the charge-discharge control unit 212 performs the control of the charge and discharge of the battery 240 by controlling the step-up and step-down converter. For example, when the state-of-charge (SOC) of the battery 240 is lower than a target value, the charge-discharge control unit 212 controls the step-up and step-down converter such that the battery 240 is charged, and when the SOC of the battery 240 is higher than the target value, the charge-discharge control unit 212 controls the step-up and step-down converter such that the battery 240 is discharged.

The MG control unit 213 performs a drive control of the MG 250 of the vehicle 200. When drive power of the MG 250 is necessary, the MG control unit 213 controls the MG 250 such that the drive power is output, and when electricity generation is necessary, the MG control unit 213 controls the MG 250 such that electricity generation is performed.

In FIG. 1, the HV-ECU 210 is shown as an exemplary control device of the vehicle 200. However, the vehicle 200 is equipped with various control devices (ECUs), in addition to the HV-ECU 210.

The fuel injection device 220 is a device that controls the amount of the fuel to be injected into a cylinder and the like of the engine of the vehicle 200, based on the amount of depression of an accelerator pedal. The battery 240 is equipped in the vehicle 200 that is a hybrid vehicle (HV), and the battery 240 is a secondary battery that outputs electric power for driving the MG 250 and that accumulates electric power generated by regeneration of the MG 250. As the battery 240, for example, a lithium ion battery can be used.

The MG 250 is a motor generator that bears the motor output part of the drive power of the vehicle 200 as a hybrid vehicle (HV) and that generates electric energy by regeneration of traveling energy.

The DCM 260 is an exemplary communication unit or wireless communication device that is equipped in the vehicle 200, and for example, performs wireless communication through a communication line such as 3rd generation (3G), long term evolution (LTE), fourth generation (4G) or fifth generation (5G). The e-SIM 261 is attached to the DCM 260. The e-SIM 261 is a SIM that allows the selection of any one of the common carrier servers 10A, 10B, 10C, and the selection of the common carrier servers 10A, 10B, 10C can be performed from the vehicle control server 100.

Next, a specific example of the control command to be generated by the control command generation unit 180 will be described.

In the engine control, in a spot where the predicted traveling load is low, the increase in engine output is suppressed, and the fuel consumption is reduced. For example, in the case of a vehicle having a turbo engine, the control is performed such that the opening degree of an intake control valve (for example, an inlet guide vane (IGV)) disposed at an air intake port of a turbine is decreased, and thereby, the increase in turbocharging pressure is suppressed.

As another example of the engine control, in a region where a large amount of environmentally hazardous substance is emitted (for example, in an industrial district, and the like), exhaust emission control is enhanced, and the emission amount of nitrogen oxides (NOx) and the like is reduced. For example, an increase in the opening degree of an EGR valve, a change in valve timing, or the like may be performed.

In the control of a hybrid vehicle, the ratio of the traveling with only the output of the MG 250 is increased, and the engine is purposely stopped, depending on the traveling load and the predicted value of the accuracy of the vehicle control. Further, the fuel consumption is reduced by stopping a control of increasing the output of a hybrid system (the total output of the engine and the MG 250) and a control of increasing drivability.

For example, the fuel consumption may be reduced by increasing the charging rate of the battery 240 before a route where the traveling load increases and driving the MG 250 at the route in preference to the engine.

When a section with a high traveling load is short and the vehicle can pass through the section in a short time, the fuel consumption may be reduced by temporarily permitting a decrease in the SOC of the battery 240, temporarily increasing the output of the battery 240, purposely driving the MG 250 and suppressing the start of the engine.

In the case of a plug-in hybrid vehicle, the fuel consumption may be reduced by sufficiently charging the battery 240, effectively using the electric power of the battery 240, purposely driving the MG 250 and suppressing the start of the engine.

As for an air-conditioning control, the fuel consumption may be reduced by increasing the operation of a compressor of an air-conditioner to previously decrease the temperature of a vehicle cabin on a route with a low traveling load before a route with a high traveling load and suppressing the operation of the compressor to decrease the load on the engine and the MG 250 when the vehicle passes through the route with a high traveling load. By driving the compressor of the air-conditioner in this way, the load on the vehicle 200 may be standardized.

Further, weather information about a route where the vehicle travels may be acquired through the DCM 260. The load due to the drive of the compressor of the air-conditioner may be estimated from air temperature, humidity, precipitation, snow accumulation and the like. The drive of the compressor, the ratio of intake of external air, and an air volume control of a blower may be optimized. Furthermore, the control command may be generated depending on the update cycle for the weather information and the degree of detail in announcement region for the weather information (the degree of detail in spatial discrimination). That is, the control command may be generated whenever the weather information is updated, and the control command may be generated whenever the announcement region for the weather information is changed.

Figure 4:
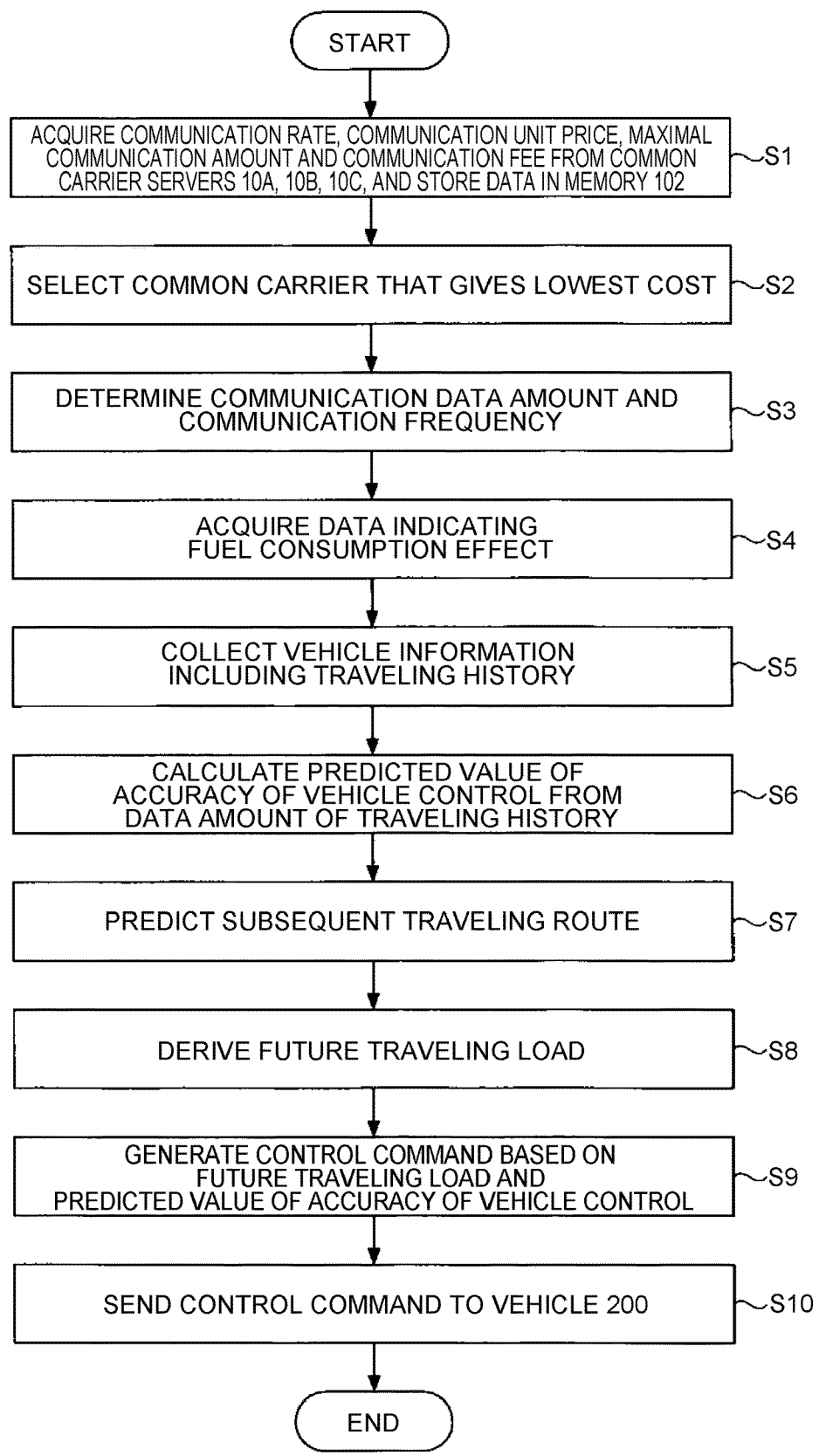
FIG. 4 is a flowchart showing a process that is executed by a vehicle control server 100.

FIG. 4 is a flowchart showing a process that is executed by the vehicle control server 100. The vehicle control server 100 repeatedly executes processes from START to END in a predetermined control cycle.

The communication management unit 110 accesses the common carrier servers 10A, 10B, 10C, acquires the data indicating the communication rate, the communication unit price, the maximal communication amount and the communication fee, and stores the data in the memory 102 (step S1). Thereby, the vehicle control server 100 obtains the data indicating the communication fees and the others of the three carriers.

Next, the communication management unit 110 compares the communication rate, the communication unit price, the maximal communication amount and the communication fee among the three carriers, and selects a common carrier that gives the lowest cost (step S2). Thereby, the common carrier server (any one of the common carrier servers 10A, 10B, 10C) with which the vehicle control server 100 communicates is determined.

Next, the communication amount determination unit 120 determines the communication data amount and the communication frequency (step S3). For example, the communication amount determination unit 120 may determine the communication data amount and the communication frequency such that the communication frequency increases when the data amount is small, and may determine the communication data amount and the communication frequency such that the communication frequency decreases when the data amount is large.

Next, the fuel consumption effect acquisition unit 130 acquires the data indicating the fuel consumption effect from the memory 102 (step S4). The data indicating the characteristic of the relation of the fuel consumption effect and the communication fee shown in FIG. 2 is obtained from the data indicating the fuel consumption effect acquired in step S4 and the communication fee of the common carrier that is determined in step S2 from the communication fees acquired in step S1.

Next, the collection unit 140 collects the vehicle information of the vehicle 200 (step S5). The vehicle information is uploaded from the vehicle 200, and is stored in the memory 102.

Next, the accuracy calculation unit 150 calculates the predicted value of the accuracy of the vehicle control, from the data amount of the traveling history included in the vehicle information acquired in step S5 (step S6). The predicted value of the accuracy of the vehicle control is calculated to a higher value as the data amount is larger. This is because a larger data amount makes it possible to generate a control command having a higher accuracy.

Next, from the traveling history of the vehicle 200, the traveling route prediction unit 160 statistically predicts the destination, and predicts the subsequent traveling route (step S7). The traveling route is obtained from the past traveling histories about the vehicle 200 and other vehicles.

Next, the traveling load derivation unit 170 derives the future traveling load on the vehicle 200 (step S8). The traveling load that is derived in step S8 is a future traveling load on the vehicle 200 that is derived based on the vehicle speed distribution and the traveling load distribution aggregated from other vehicles on a route where the vehicle 200 travels.

Next, the control command generation unit 180 generates the control command, based on the future traveling load and the predicted value of the accuracy of the vehicle control (step S9). The control command generation unit 180, first, derives the control command to be sent to the vehicle 200, based on the future traveling load on the vehicle 200 that is predicted by the traveling load derivation unit 170, and regulates the control command, depending on the predicted value of the accuracy of the vehicle control that is calculated by the accuracy calculation unit 150. The control command finally generated by the control command generation unit 180 has a value after the regulation based on the predicted value of the accuracy of the vehicle control.

Next, the main control unit 101 makes the communication unit 190 send the control command generated in step S9 to the vehicle 200 (step S10). The DCM 260 of the vehicle 200 receives the control command through the internet 50, the common carrier server (any one of the common carrier servers 10A, 10B, 10C) and the communication line. The engine control unit 211, the charge-discharge control unit 212, the MG control unit 213 and others of the vehicle 200 perform the control for reducing the fuel consumption.

Thus, the vehicle control server 100 calculates the predicted value of the accuracy of the vehicle control from the collected vehicle information. Further, the vehicle control server 100 derives the control command for reducing the fuel consumption of the vehicle 200, from the future traveling load on the vehicle 200 that is derived based on the vehicle information aggregated from other vehicles on the route where the vehicle 200 travels. Furthermore, the vehicle control server 100 regulates the derived control command based on the predicted value of the accuracy of the vehicle control.

Then, by the control command generated in this way, the vehicle 200 performs the control for reducing the fuel consumption.

Accordingly, it is possible to provide the vehicle control server 100, the vehicle control system 300 and the vehicle control method in which the balance between the communication data amount and the accuracy of the vehicle control is considered.

The configuration in which the e-SIM 261 is attached to the DCM 260 and the common carrier server (any one of the common carrier servers 10A, 10B, 10C) is selected has been described above. However, instead of the e-SIM 261, a device that can realize a similar function may be used.

The configuration in which the common carrier server (any one of the common carrier servers 10A, 10B, 10C) is selected has been described above. However, the number of common carriers may be one. In this case, the communication management unit 110 may select a plan that gives the lowest cost, from plans that are provided by the one common carrier (a plurality of plans that are different in fee structure).

The configuration in which the communication amount determination unit 120 determines the communication data amount and the communication frequency in the process of step S3 has been described above. However, the communication amount determination unit 120 may acquire the communication data amount and the communication frequency, instead of determining the communication data amount and the communication frequency. For example, a previously determined communication data amount and communication frequency may be stored in the memory 102, and the communication data amount and the communication frequency may be acquired (read) from the memory 102 in the process of step S3. For previously determining the communication data amount and the communication frequency, the above-described step S3 (the process of determining the communication data amount and the communication frequency) may be previously performed, and the communication data amount and the communication frequency may be stored in the memory 102.

The vehicle control method, the information processing device and the vehicle control system in the exemplary embodiment of the disclosure have been described above. The disclosure is not limited to the specifically disclosed embodiment, and various modifications and alterations can be made without departing from the scope of the claims.

What is claimed is:

1. A control method for a vehicle, the control method being executable by at least one vehicle control server including a processor for executing programs stored in memory, the at least one vehicle control server includes a communication unit configured to perform wire or wireless data communication with the at least one vehicle control server, the control method comprising:
determining a communication data amount such that a fuel consumption reduction effect with respect to a communication cost is large, the fuel consumption reduction effect being a fuel consumption reduction effect in the vehicle configured to receive a fuel reduction command to reduce fuel consumption of the vehicle, the communication cost being a communication cost of a communication with the vehicle through the communication unit;
collecting vehicle information from the vehicle indicating a state of the vehicle, wherein the amount of collected vehicle information is based on the communication data amount;
calculating an accuracy of control of the vehicle based on the communication data amount using a previously determined relationship between the communication data amount and accuracy of vehicle control, wherein the accuracy of vehicle control increases with an increase in the communication data amount;
deriving the fuel consumption for a route, based on a vehicle speed and a fuel consumption amount of other vehicles on the route, the route being a route where the vehicle plans to travel;
generating the fuel reduction command based on the derived fuel consumption, and based on the calculated accuracy, the fuel reduction command being a command to reduce the fuel consumption of the vehicle on the route;
sending the fuel reduction command to the vehicle through the communication unit; and controlling the vehicle based on the fuel reduction command.

2. The control method for the vehicle according to claim 1, further comprising acquiring information about the communication data amount, through the communication unit.

3. The control method for the vehicle according to claim 1, further comprising decreasing a fuel reduction amount in accordance with the fuel reduction command, in response to a decrease in the calculated accuracy.

4. The control method for the vehicle according to claim 3, further comprising the fuel reduction amount in accordance with the fuel reduction command is set to a constant value, when the calculated accuracy is higher than a first threshold.

5. The control method for the vehicle according to claim 3, further comprising the fuel reduction amount in accordance with the fuel reduction command is decreased depending on the calculated accuracy, when the calculated accuracy is equal to or lower than a first threshold and is higher than a second threshold, the second threshold being lower than the first threshold.

6. The control method for the vehicle according to claim 3, further comprising the fuel reduction amount in accordance with the fuel reduction command is set to zero, when the calculated accuracy is equal to or lower than a second threshold.

7. A vehicle control server comprising:
a processor for executing programs stored in memory;
a communication unit configured to perform wire or wireless data communication with the at least one vehicle control server; and
circuitry configured to
  determine a communication data amount such that a fuel consumption reduction effect with respect to a communication cost is large, the fuel consumption reduction effect being a fuel consumption reduction effect in the vehicle configured to receive a fuel reduction command to reduce fuel consumption of the vehicle, the communication cost being a communication cost of a communication with the vehicle through the communication unit;
  collect vehicle information from a vehicle collecting vehicle information from the vehicle indicating a state of the vehicle, wherein the amount of collected vehicle information is based on the communication data amount, the communication data amount being acquired through the communication unit;
  calculate an accuracy of control of the vehicle, based on the communication data amount using a previously determined relationship between the communication data amount and accuracy of vehicle control, wherein the accuracy of vehicle control increases with an increase in the communication data amount;
  derive the fuel consumption for a route, based on a vehicle speed and a fuel consumption amount of other vehicles on the route, the route being a route where the vehicle plans to travel;
  generate the fuel reduction command based on the derived fuel consumption, and based on the calculated accuracy, the fuel reduction command being a command to reduce fuel consumption of the vehicle on the route;
  send the fuel reduction command to the vehicle through the communication unit; and
  control the vehicle based on the fuel reduction command.

8. A vehicle control system comprising:
a vehicle; and
a vehicle control server including a processor for executing programs stored in memory, the vehicle control server configured to communicate with the vehicle, the vehicle control server including a communication unit configured to perform wire or wireless data communication with the at least one vehicle control server and circuitry, the circuitry being configured to
  determine a communication data amount such that a fuel consumption reduction effect with respect to a communication cost is large, the fuel consumption reduction effect being a fuel consumption reduction effect in the vehicle configured to receive a fuel reduction command to reduce fuel consumption of the vehicle, the communication cost being a communication cost of a communication with the vehicle through the communication unit;
  collect vehicle information from the vehicle collecting vehicle information from the vehicle indicating a state of the vehicle, wherein the amount of collected vehicle information is based on the communication data amount, the communication data amount being acquired through the communication unit
  calculate an accuracy of control of the vehicle, based on the communication data amount using a previously determined relationship between the communication data amount and accuracy of vehicle control, wherein the accuracy of vehicle control increases with an increase in the communication data amount;
  derive the fuel consumption for a route, based on a vehicle speed and a fuel consumption amount of other vehicles on the route, the route being a route where the vehicle plans to travel;
  generate the fuel reduction command based on the derived fuel consumption, and based on the calculated accuracy, the fuel reduction command being a command to reduce the fuel consumption of the vehicle on the route;
  send the fuel reduction command to the vehicle through the communication unit; and
  control the vehicle based on the fuel reduction command.

* * * * *